(12) United States Patent
Doeppling et al.

(10) Patent No.: US 8,690,447 B2
(45) Date of Patent: Apr. 8, 2014

(54) BALL ROLLER BEARING, IN PARTICULAR FOR ABSORBING COMBINED RADIAL AND AXIAL LOADS

(75) Inventors: Horst Doeppling, Herzogenaurach (DE); Heinrich Hofmann, Schweinfurt (DE); Ernst Geiger, Hallerndorf (DE); Ernst Masur, Untereuerheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 236 days.

(21) Appl. No.: 13/254,769

(22) PCT Filed: Mar. 19, 2010

(86) PCT No.: PCT/EP2010/053631
§ 371 (c)(1),
(2), (4) Date: Sep. 2, 2011

(87) PCT Pub. No.: WO2010/106174
PCT Pub. Date: Sep. 23, 2010

(65) Prior Publication Data
US 2011/0311174 A1    Dec. 22, 2011

(30) Foreign Application Priority Data

Mar. 20, 2009  (DE) .......................... 10 2009 014 169

(51) Int. Cl.
*F16C 33/38* (2006.01)
*F16C 33/60* (2006.01)
*F16C 33/41* (2006.01)
*F16C 33/34* (2006.01)

(52) U.S. Cl.
USPC ........... 384/523; 384/504; 384/526; 384/531; 384/568

(58) Field of Classification Search
USPC ......... 384/447, 450, 470, 491, 499, 500, 502, 384/503, 504, 513, 514, 516, 523, 526, 530, 384/531, 558, 568, 613, 617, 623
See application file for complete search history.

(56) References Cited

U.S. PATENT DOCUMENTS 1,127,133 A * 2/1915 Webb ............................ 384/597
1,608,892 A * 11/1926 Linde ............................ 384/530

(Continued)

FOREIGN PATENT DOCUMENTS

DE           100 27 105 A1    2/2001
DE      10 2006 019 228 A1   10/2007

(Continued)

*Primary Examiner* — Marcus Charles
*Assistant Examiner* — Adam D Rogers
(74) *Attorney, Agent, or Firm* — Lucas & Mercanti, LLP (57) ABSTRACT

A ball roller bearing, which has an outer and inner bearing ring with a groove-shaped raceways and ball rollers, which roll between the bearing rings in the raceways. The rollers are held at distances from each other in the circumferential direction by a bearing cage and which have a width that is dimensioned larger than the radial distance between the inside and the outside of the bearing rings. The raceways are divided into two segments by an axially centered annular groove such that a first ball roller rolls on two first diagonally opposed track segments and a second ball roller rolls on two second diagonally opposed track segments of the bearing rings. Both bearing rings are single-piece components, and the bearing cage is formed by two identical double prong-type cages acting independently of each other. The bearing is filled with the ball rollers by an axial tilt cam assembly method.

7 Claims, 4 Drawing Sheets

(56) References Cited

U.S. PATENT DOCUMENTS

| | | | |
|---|---|---|---|
| 6,382,836 B1 * | 5/2002 | Shoda et al. | 384/47 |
| 7,819,589 B2 * | 10/2010 | Hofmann et al. | 384/568 |
| 7,891,880 B2 * | 2/2011 | Hofmann et al. | 384/568 |
| 8,047,723 B2 * | 11/2011 | Hofmann et al. | 384/568 |
| 2005/0117827 A1 * | 6/2005 | Fujii et al. | 384/510 |

FOREIGN PATENT DOCUMENTS

| | | |
|---|---|---|
| DE | 10 2007 062 319 A1 | 6/2009 |
| GB | 141 694 A | 7/1921 |
| JP | 2006 250200 A | 9/2006 |

* cited by examiner

BALL ROLLER BEARING, IN PARTICULAR FOR ABSORBING COMBINED RADIAL AND AXIAL LOADS

CROSS-REFERENCE TO RELATED APPLICATIONS

This application is a 371 of PCT/EP2010/053631 filed Mar. 19, 2010, which in turn claims the priority of DE 10 2009 0114 169.3 filed Mar. 20, 2009. The priority of both applications is hereby claimed and both applications are incorporated by reference herein.

FIELD OF THE INVENTION

The invention relates to a ball roller bearing that can be used for applications with high tilting resistance and combined radial and axial forces. For example, the roller bearing can be used for mounting of belt tensioning pulleys for the traction mechanism drive of internal combustion engines.

BACKGROUND OF THE INVENTION

Ball roller bearings are rolling bearings with special rolling bodies designed as ball rollers, which ball rollers, proceeding from a spherical basic shape, have in each case two side surfaces which are flattened from said spherical basic shape and which are arranged parallel to one another and between which in each case the running surfaces of the ball rollers are arranged. A ball roller bearing of said type is known for example from the German patent application with the file reference 10 2007 062 319.6 which was not published before the filing date of the present patent application, said ball roller bearing being composed substantially of an outer bearing ring and an inner bearing ring and of a multiplicity of ball rollers which are arranged between said bearing rings and which are held with uniform spacings to one another in the circumferential direction by a bearing cage. Here, the ball rollers have a width between their side surfaces of approximately 70% of the diameter of their spherical basic shape, and roll with their running surfaces in two channel-shaped raceways formed into the inner side of the outer bearing ring and into the outer side of the inner bearing ring, the depth of which channel-shaped raceways amounts to approximately 20% of the diameter of the spherical basic shape of the ball rollers. Since the spacing between the inner side of the outer bearing ring and the outer side of the inner bearing ring therefore amounts to only approximately 60% of the diameter of the spherical basic shape of the ball rollers, and the ball rollers can therefore no longer be inserted, as is conventional, axially straight through the spacing between the bearing rings into the ball roller bearing, said ball roller bearing is filled by means of a novel axial-tilt eccentric assembly process in which the inner bearing ring of the two bearing rings, which are arranged in a horizontal concentric position with respect to one another, is initially firstly radially movable slightly along a bearing longitudinal central axis and secondly arranged on an axially offset higher plane than the outer bearing ring, in order to create between the bearing rings a spacing which is larger than the width of the ball rollers. Here, the travel of the radial mobility of the inner bearing ring on the bearing longitudinal central axis, and the height of the axial offset of the two bearing rings with respect to one another, amounts in each case to approximately 25% of the width of the raceways of the bearing rings of the ball roller bearing, since it is thereby ensured that, from the filling of the first ball roller until the filling of the last ball roller, the spacing between the bearing rings is always greater than the width of the ball rollers.

The actual assembly of the ball rollers begins initially in that a first ball roller which is aligned with its side surfaces toward the bearing rings is supplied to the ball roller bearing at the point, provided as a filling point, of the greatest spacing between the bearing rings on the bearing longitudinal central axis, and the inner bearing ring is pushed radially into an eccentric stop position. The ball rollers are thereafter successively inserted, in a slightly tilted position in relation to the outer bearing ring, into the filling point between the bearing rings until the remaining free filling space between the bearing rings corresponds approximately only to the diameter of the spherical basic shape of a single ball roller. After all of the provided ball rollers have been filled into the ball roller bearing, the inner bearing ring is axially lowered while the outer bearing ring is simultaneously axially raised, such that the two bearing rings are arranged in a common plane and the ball rollers which have been tilted into the raceways of the bearing rings are braced between the raceways. In said position, the outer bearing ring is subsequently rotationally accelerated to a rotational speed at which the ball rollers, as a result of intrinsic rotation and as a result of centrifugal force, are automatically aligned and assume a uniformly oblique position within the raceways of the bearing rings. The inner bearing ring and the outer bearing ring are thereafter simultaneously axially lowered until the ball rollers are arranged in a horizontal straight position in the raceways of the bearing rings, and the ball rollers which have been filled in are distributed uniformly on the pitch circle of the ball roller bearing and the bearing cage is inserted through the spacing between the bearing rings.

Although a ball roller bearing of said type is characterized by a high filling ratio with rolling bodies, and therefore a significantly increased radial load-bearing capacity, in relation to a deep-groove ball bearing of the same design, said ball roller bearing simultaneously has the disadvantage that the capability thereof to be loaded with axial forces is subjected to quite narrow limits and it is therefore unsuitable for applications with high tilting resistance and high combined radial and axial forces.

A generic ball roller bearing which is suitable for such applications with high tilting resistance and combined radial and axial forces is, in contrast, already known from DE 100 27 105 A1. Said ball roller bearing is also composed substantially of an outer bearing ring and an inner bearing ring with channel-shaped raceways in each case on the inner and outer sides thereof and also of a multiplicity of ball rollers which roll between said bearing rings in the raceways and which are held with uniform spacings to one another in the circumferential direction by a bearing cage, which ball rollers have between their side surfaces a width which is greater than the radial spacing between the inner side and the outer side of the bearing rings. Here, to permit assembly of the bearing, either the inner or the outer bearing ring is composed of two axially separate ring parts which are connected to one another by means of a screw connection only after the bearing cage has been inserted and filled with the ball rollers. The raceways in the two bearing rings are furthermore divided into in each case two raceway segments by in each case one axially centrally encircling groove, such that in each case two ball rollers which are adjacent to one another are arranged with alternately crossing contact angle axes between the bearing rings in such a way that a first ball roller rolls with its running surface on two first diagonally opposite raceway segments and a second ball roller rolls with its running surface on two second diagonally opposite raceway segments of the inner and outer bearing rings.

A ball roller bearing of said type has however proven to be disadvantageous from numerous aspects, in particular on account of the two-part design of one of the two bearing rings. The two-part design of one of the bearing rings requires increased production and assembly expenditure not only as a result of the increased number of components but also as a result of the need for highly precise production of the tolerance-afflicted parting point between the two ring parts, which increased production and assembly expenditure has an adverse effect on the production costs of a ball roller bearing of said type. Furthermore, the two-part design of one of the bearing rings has the effect that, despite cumbersome bracing of the two bearing rings during bearing operation as a result of arising settling effects, loosening of the assembly can occur, as a result of which the tilting play of the ball rollers is disadvantageously increased, resulting in premature wear of the ball roller bearing. It is likewise disadvantageous that a transportable structural unit cannot be formed with split bearing rings. Finally, the single-piece design of the bearing cage as a window-type cage in such ball roller bearings has proven to be disadvantageous because, in certain load states of the bearing, different relative rotational speeds can arise between the ball rollers inclined with their contact angle axes inclined in one direction and the ball rollers inclined with their contact angle axes in the other direction, as a result of which bracing effects can arise in the bearing cage and increased friction can occur between the ball rollers and their cage pockets in the bearing cage, and which likewise contribute to premature wear of the ball roller bearing.

SUMMARY OF THE INVENTION

Taking the presented disadvantages of the solutions of the known prior art as a starting point, the invention is therefore based on the object of designing a ball roller bearing, in particular for accommodating combined radial and axial loads, which can be produced simply and cheaply and which can be assembled with little expenditure to form a transportable structural unit and in which premature wear as a result of increased tilting play of the ball rollers and as a result of bracing effects in the bearing cage are eliminated.

Broadly, the invention relates to a ball roller bearing for accommodating combined radial and axial loads, comprising an outer bearing ring with a channel-shaped raceway on the inner side thereof, an inner bearing ring with a channel-shaped raceway on the outer side thereof, and a multiplicity of ball rollers, which roll between the bearing rings in the raceways. The ball rollers are held with uniform spacings to one another in the circumferential direction by a bearing cage and ball rollers have in each case two side surfaces, which are flattened symmetrically proceeding from a spherical basic shape and are arranged parallel to one another. The ball rollers also have a width between the side surfaces, which width is dimensioned to be larger than the radial spacing between the inner side and the outer side of the bearing rings. The raceways in the two bearing rings are divided by in each case one axially centrally encircling annular groove into in each case two raceway segments, and in each case two ball rollers, which are adjacent to one another, are arranged with alternately crossing contact angle axes between the bearing rings, such that a first ball roller rolls with its running surface on two first diagonally opposite raceway segments and a second ball roller rolls with its running surface on two second diagonally opposite raceway segments of the inner and outer bearing rings.

According to the invention, the object is achieved with a ball roller bearing in that both the outer bearing ring and the inner bearing ring are formed as unipartite components, the ball roller bearing is filled with the ball rollers according to the axial-tilt eccentric assembly process, which is known per se, through the radial spacing between the bearing rings, and the bearing cage is formed by two structurally identical comb-type cages which act independently of each other and which can likewise be inserted into the ball roller bearing through the radial spacing between the bearing rings.

The invention is therefore based on the realization that, through the use of the axial-tilt eccentric assembly process, which was originally designed for purely radial ball roller bearings, for filling a ball roller bearing provided for combined radial and axial loads with the ball rollers, it is possible for both bearing rings of a ball roller bearing of said type to be formed in one piece, and considerable savings in the production costs thereof can be obtained as a result of the thus reduced production and assembly expenditure. Furthermore, the unipartite design of the two bearing rings of the ball roller bearing designed according to the invention has the effect that loosening of the assembly of ring parts clamped to one another, and therefore an increase in the tilting play of the ball rollers, can no longer occur, and that the ball roller bearing, after the assembly thereof, forms a structural unit which is secured for transport. At the same time, as a result of the use of two comb-type cages, which act independently of one another, as a bearing cage, it is achieved that the ball rollers which are inclined with their contact angle axes in one direction and the ball rollers which are inclined with their contact angle axes in the other direction can roll with different relative rotational speeds with respect to one another, and therefore bracing effects, and increased friction between the ball rollers and their cage pockets in the bearing cage, can no longer occur.

Preferred embodiments and refinements of the ball roller bearing designed according to the invention will be described in the subclaims.

All of the first ball rollers, which are inclined with their contact angle axes in one direction, can be guided in corresponding cage pockets of one comb-type cage, and all of the second ball rollers, which are inclined with their contact angle axes in the other direction, can be guided in corresponding cage pockets of the other comb-type cage. This means that in each case only every second ball roller is guided both in one and also in the other comb-type cage, and that the two identically designed comb-type cages are therefore arranged in the ball roller bearing so as to be offset with respect to one another by one ball roller pitch.

The comb-type cages can each have a rectangular profile cross-section in which an outer profiled limb is aligned radially toward the inner bearing ring and an inner profiled limb is aligned axially into the bearing interior, in such a way that the axial profiled limbs of the two comb-type cages point toward one another. Formed in said axial profiled limbs are the cage pockets, designed in each case as semi-circular recesses, which cage pockets, at their lowest point, extend approximately as far as the radial profiled limb of each comb-type cage. Additionally, the pocket base of each cage pocket is formed with a bevel which is matched in each case to the inclination of the contact angle axis of the ball roller to be held in said cage pocket, and which is provided as a contact surface for the running surface of said ball roller.

The two comb-type cages can have, between their cage pockets, a plurality of lugs which are integrally formed on the radial profiled limbs of said comb-type cages and which project obliquely outward from the axial profiled limbs of said comb-type cages. This is to be understood to mean that two parallel incisions which are spaced apart from one another and which extend as far as the radial profiled limb are formed into the axial profiled limb of the comb-type cages in each case between the cage pockets, and the limb portion arranged between said incisions is bent or formed obliquely outwards out of the axial profiled limb. With the lugs thereby generated, it is then possible, by means of an auxiliary tool, for the comb-type cages to be fixed, from the bearing axial sides, by being latched into the raceway of the outer bearing ring. As an alternative to this, however, it is also possible for lugs of said type to be formed in the same way in each case out of the radial profiled limbs of the comb-type cages, and for the comb-type cages to be fixed in the ball roller bearing by being latched into the raceway of the inner bearing ring.

Furthermore, in an expedient refinement of the ball roller bearing, when the bearing is at a standstill, the ball rollers can be fixed in a starting position in which, when the ball roller bearing starts to rotate, they are immediately aligned in their precise angular positions corresponding to their contact angle axes, and in the circumferential direction. Here, the ball rollers bear in each case alternately with an edge region of their running surfaces against the obliquely formed pocket bases of the cage pockets of one comb-type cage, and are simultaneously aligned with one of their side surfaces against the undersides of the lugs of the other comb-type cage. Tumbling of the ball rollers on their raceway segments transversely with respect to the circumferential direction thereof, and therefore bracing effects between the ball rollers and their comb-type cages, are thereby avoided when the ball roller bearing starts to rotate.

Finally, as an advantageous embodiment of the ball roller bearing, the radii of the running surfaces of the ball rollers can be slightly smaller than the radii of the raceway segments in the bearing rings, such that the ball rollers roll with in each case only punctiform contact on the raceway segments of said bearing rings, and the ball roller bearing therefore acts substantially as a four-point bearing. Here, the center points of the radii of the raceway segments are in each case arranged slightly below and above the pitch circle plane of the ball rollers and in each case adjacent to the bearing longitudinal axis slightly to the left and to the right, such that the raceways of the two bearing rings have, overall, a gothic cross-sectional profile.

BRIEF DESCRIPTION OF THE DRAWINGS

A preferred embodiment of a ball roller bearing designed according to the invention will be explained in more detail below with reference to the appended drawings, in which.

DETAILED DESCRIPTION OF THE INVENTION

Figure 1:
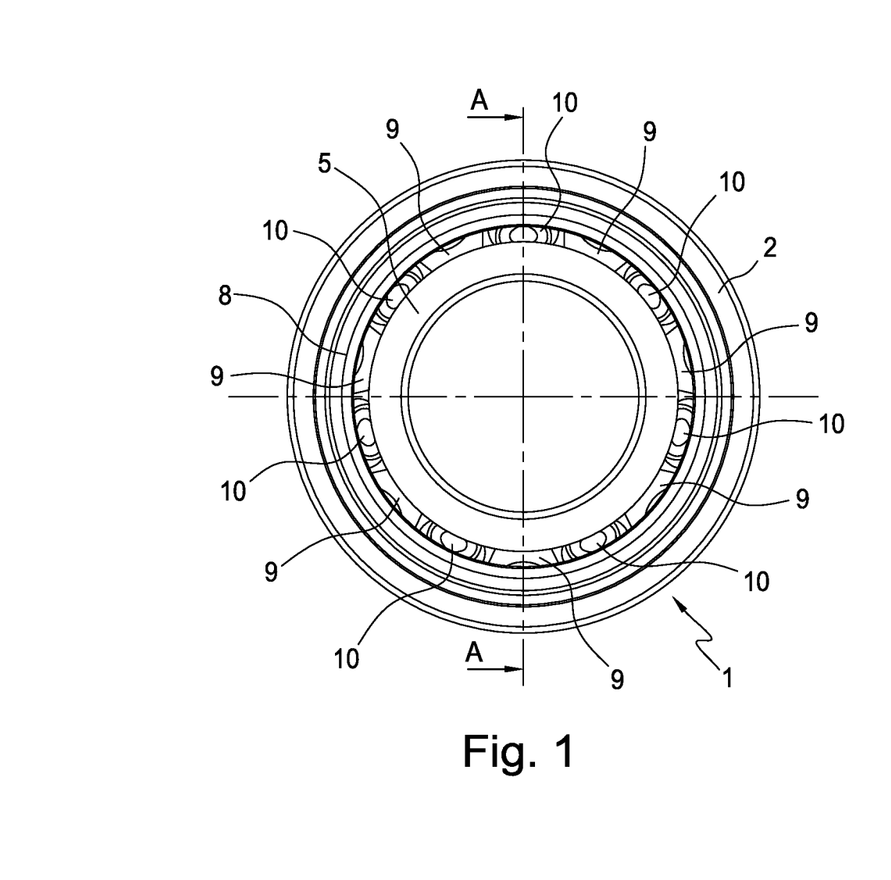
FIG. 1 shows an overall side view of a ball roller bearing designed according to the invention.
Figure 2:
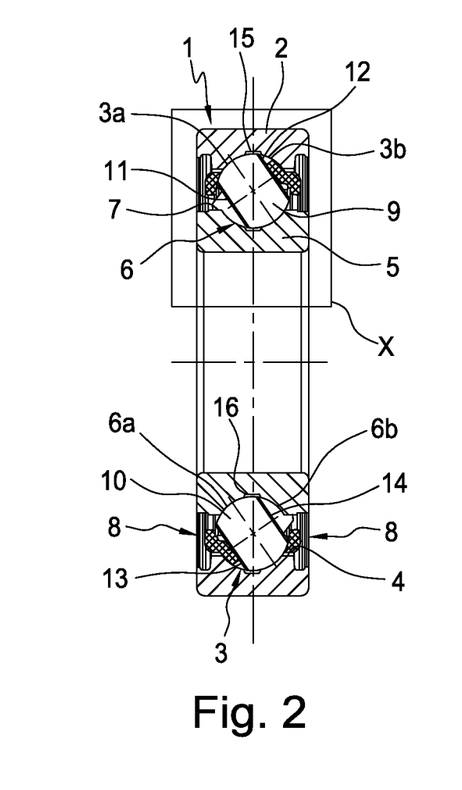
FIG. 2 shows the cross-section A-A through the ball roller bearing designed according to the invention as per FIG. 1.

FIGS. 1 and 2 clearly show a ball roller bearing 1 which is suitable for combined radial and axial loads and which is composed substantially of an outer bearing ring 2 with a channel-shaped raceway 3 on the inner side 4 thereof, and of an inner bearing ring 5 with a channel-shaped raceway 6 on the outer side 7 thereof, and of a multiplicity of ball rollers 9, 10, which ball rollers roll between said bearing rings 2, 5 in the raceways 3, 6 and which ball rollers are held with uniform spacings to one another in the circumferential direction by a bearing cage 8. Here, it can be seen in FIGS. 2 and 3 that the ball rollers 9, 10 have in each case two side surfaces 11, 12 and 13, 14, which side surfaces are flattened symmetrically proceeding from a spherical basic shape and are arranged parallel to one another, and which ball rollers are also formed with a width $B_K$ between said side surfaces 11, 12 and 13, 14, which width is dimensioned to be larger than the radial spacing $A_L$, between the inner side 4 and the outer side 7 of the bearing rings 2, 5. It can likewise be seen from said drawings that the raceways 3, 6 in the two bearing rings 2, 5 are divided by in each case one axially centrally encircling annular groove 15, 16 into in each case two raceway segments 3a, 3b and 6a, 6b, and that in each case two ball rollers 9, 10 which are adjacent to one another are arranged with alternately crossing contact angle axes D1, D2 between the bearing rings 2, 5, such that a first ball roller 9 rolls with its running surface 17 on two first diagonally opposite raceway segments 3a, 6b and a second ball roller 10 rolls with its running surface 18 on two second diagonally opposite raceway segments 3b, 6a of the inner and outer bearing rings 2, 5.

Figure 3:
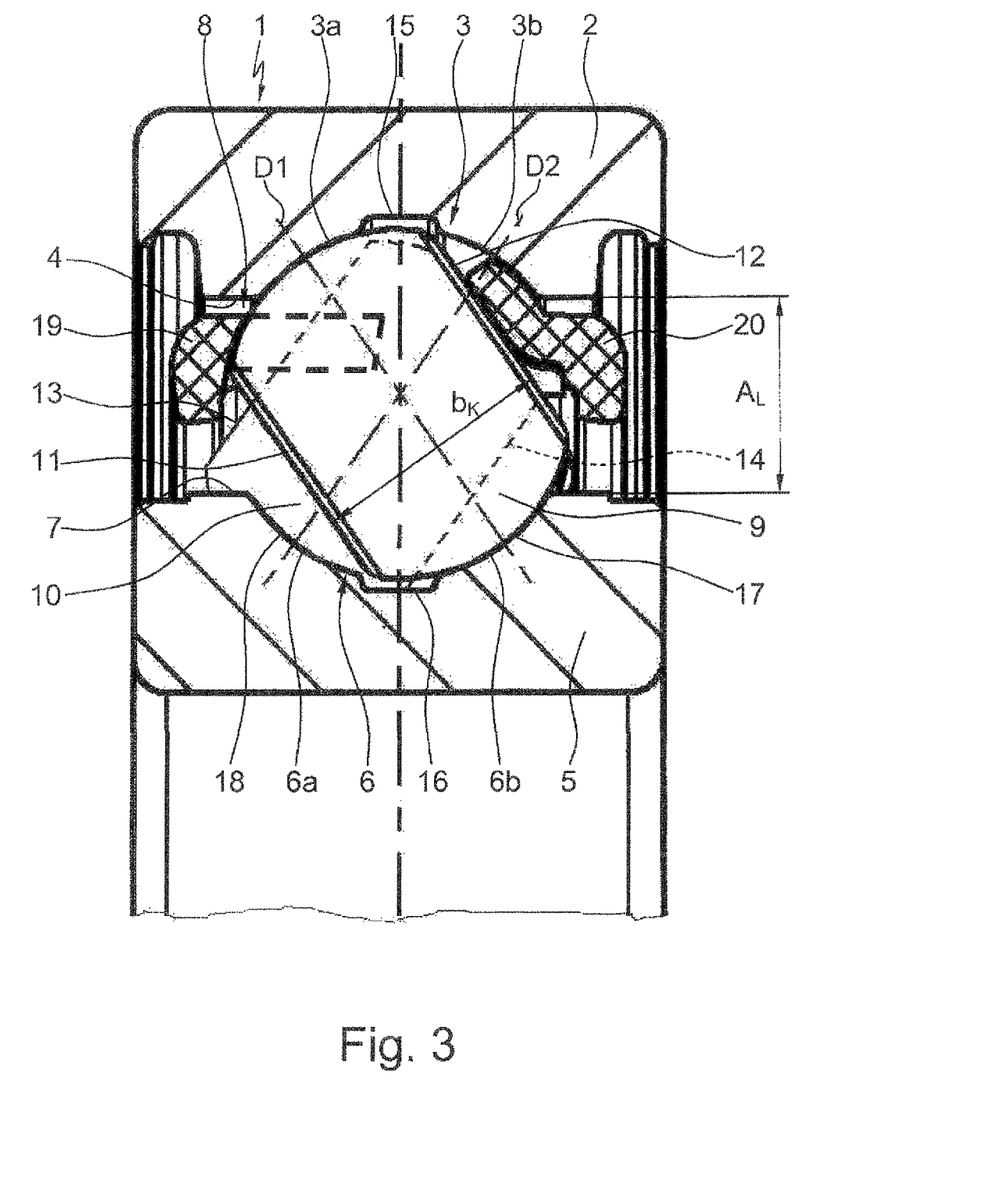
FIG. 3 shows an enlarged illustration of the detail X of the ball roller bearing designed according to the invention as per FIG. 2.

To make it possible, above all, for a ball roller bearing 1 of said type to be produced simply and cheaply and to be assembled with little expenditure to form a transportable structural unit, it is provided, as can be seen in particular from FIG. 3, that both the outer bearing ring 2 and the inner bearing ring 5 are formed, according to the invention, as unipartite components, while the bearing cage 8 is formed by two structurally identical comb-type cages 19, 20 which act independently of each other and which can be inserted into the ball roller bearing 1 through the radial spacing $A_L$ between the bearing rings 2, 5. Here, the ball roller bearing 1 is filled with the ball rollers 9, 10 according to the axial-tilt eccentric assembly process, which is known per se, through the radial spacing $A_L$ between the bearing rings 2, 5, wherein the oblique positioning of the ball rollers 9, 10 in the final method step takes place together with the insertion of the comb-type cages 19, 20.

Figure 4:
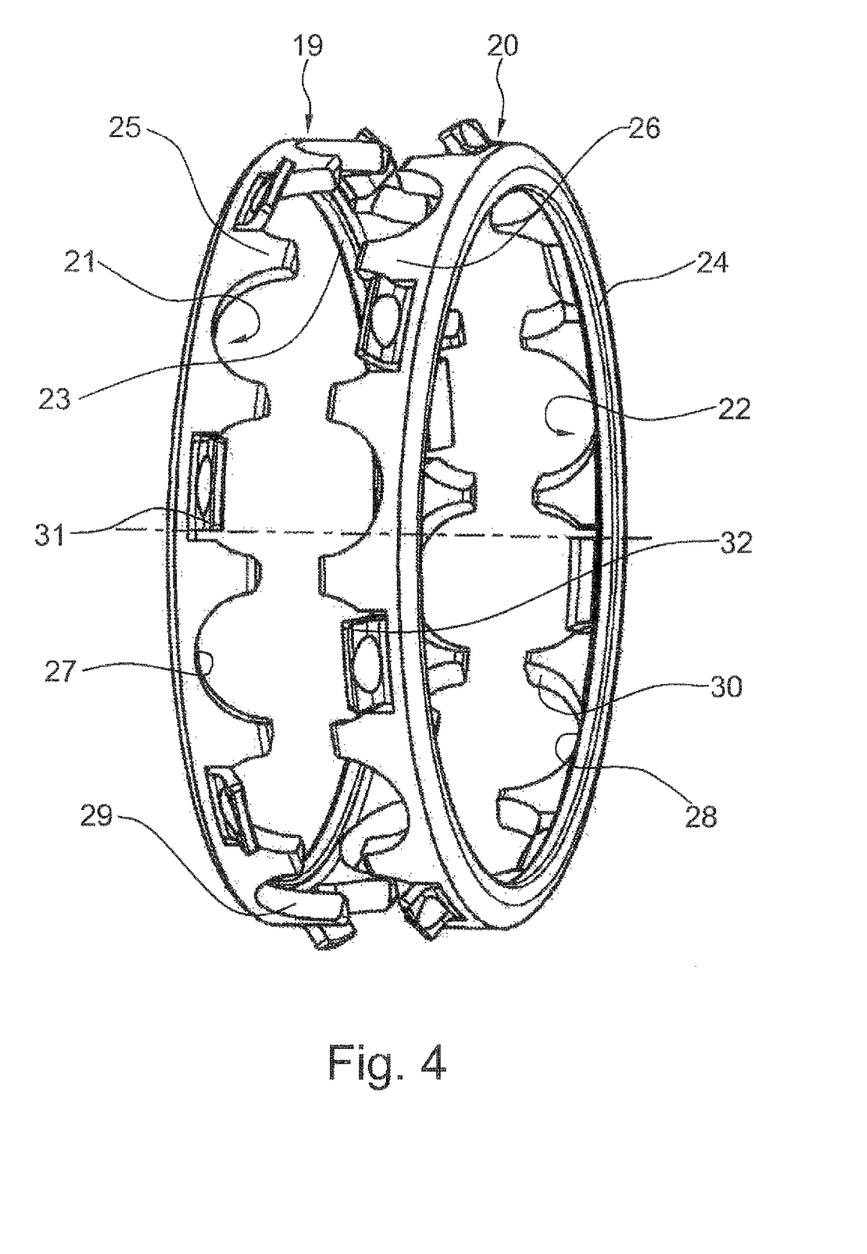
FIG. 4 shows an enlarged illustration of the two comb-type cages of the ball roller bearing designed according to the invention.

FIGS. 3 and 4 also show that all of the first ball rollers 9, which are inclined with their contact angle axes D1 in one direction, are guided in corresponding cage pockets 21 of one comb-type cage 19, and all of the second ball rollers 10, which are inclined with their contact angle axes D2 in the other direction, are guided in corresponding cage pockets 22 of the other comb-type cage 20. In this way, in each comb-type cage 19, 20, in each case only every second ball roller 9, 10 is guided in each comb-type cage 19, 20, such that the two identically designed comb-type cages 19, 20 are arranged in the ball roller bearing 1 so as to be offset relative to one another by one ball roller pitch.

A further characterizing feature of the comb-type cages 19, 20 is that these, as indicated in FIG. 3, each have a rectangular profile cross-section and are formed, as shown in more detail in FIG. 4, with an outer profiled limb 23, 24 aligned radially toward the inner bearing ring 5 and with an inner profiled limb 25, 26 aligned axially into the bearing interior. As can likewise be seen from FIG. 4, the cage pockets 21, 22 which are designed in each case as semi-circular recesses are formed in said axial profiled limbs 25, 26, which cage pockets, at their lowest point, extend approximately as far as the radial profiled limb 23, 24 of each comb-type cage 19, 20. Additionally, the pocket base 27, 28 of each cage pocket 21, 22 is also formed with a bevel 29, 30 which is matched in each case to the inclination of the contact angle axis D1, D2 of the ball roller to be held in said cage pocket 21, 22 and which is provided as a contact surface for the running surfaces 17, 18 of said ball rollers 9, 10.

It is also illustrated in FIG. 4 that the two comb-type cages 19, 20 have, between their cage pockets 21, 22, a plurality of lugs 31, 32 which are integrally formed on the radial profiled limbs 23, 24 of said comb-type cages and which project obliquely outward from the axial profiled limbs 25, 26 of said comb-type cages. By means of said lugs 31, 32, the comb-type cages 19, 20 can be fixed in the ball roller bearing 1 by being latched into the raceway 3 of the outer bearing ring 2, wherein the oblique positioning of the ball rollers 9, 10 takes place together with the latching-in of the comb-type cages 19, 20. At the same time, the lugs 31, 32 contribute to the fact that, when the bearing is at a standstill, to prevent the ball rollers 9, 10 tumbling on their raceway segments 3a, 3b, 6a, 6b when the ball roller bearing 1 starts to rotate, said ball rollers can be fixed in a starting position corresponding to the illustration in FIG. 3. In the starting position said ball rollers bear, under the inclination of their contact angle axes D1, D2, in each case with an edge region of their running surfaces 17, 18 against the pocket bases 27, 28 of the cage pockets 21, 22 of one comb-type cage 19, 20 and with one of their side surfaces 12, 13 against the undersides of the lugs 31, 32 of the other comb-type cage 20, 19.

Figure 5:
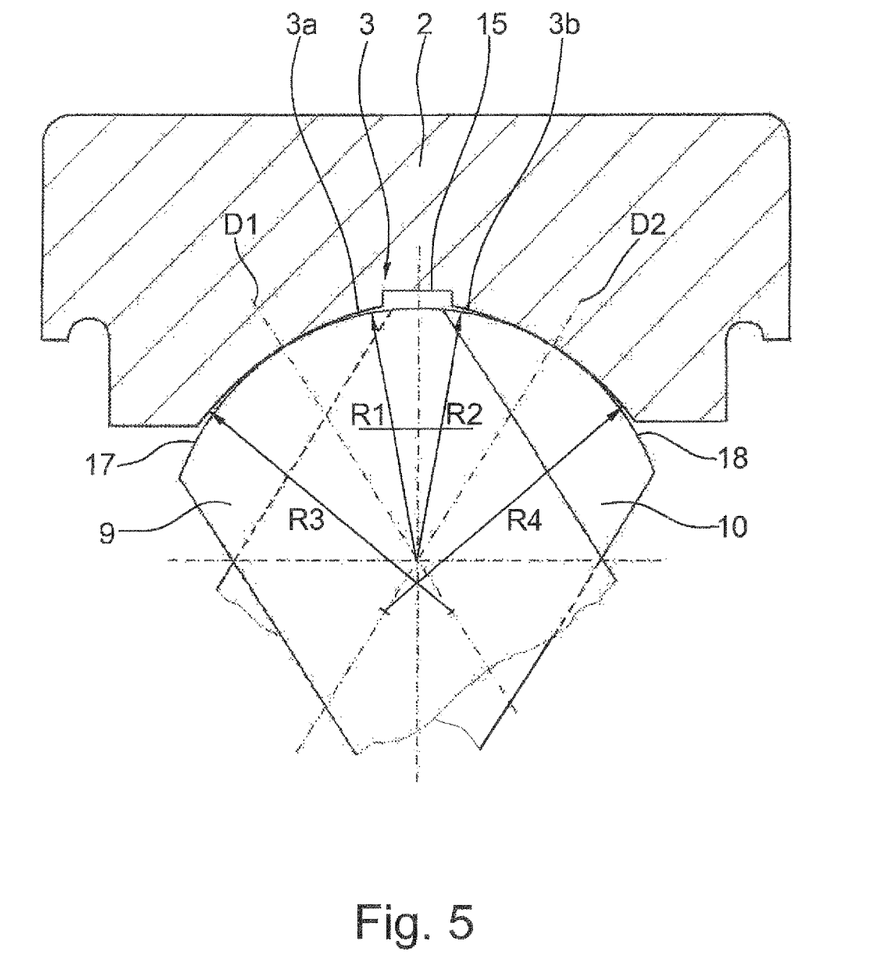
FIG. 5 shows a schematic illustration of a cross-section through the outer bearing ring of the ball roller bearing designed according to the invention, with ball rollers running thereon.

Finally, it is also shown in FIG. 5 that the radii R1, R2 of the running surfaces 17, 18 of the ball rollers 9, 10 are slightly smaller than the radii R3, R4 of the raceway segments 3a, 3b, 6a, 6b in the bearing rings 2, 5, such that the ball rollers 9, 10 roll with in each case only punctiform contact on their raceway segments 3a, 3b, 6a, 6b, and the ball roller bearing therefore acts substantially as a four-point bearing. It is possible here to clearly see that the center points of the radii of the raceway segments are in each case arranged slightly below and above the pitch circle plane of the ball rollers 9, 10 and in each case adjacent to the bearing longitudinal axis slightly to the left and to the right, such that the raceways 3, 6 of the two bearing rings 2, 5 have, overall, a gothic cross-sectional profile.

The invention claimed is:

1. A ball roller bearing for accommodating combined radial and axial loads, comprising:
   a single outer bearing ring having a channel-shaped raceway on an inner side thereof, the raceway being divided by an axially centrally encircling annular groove into two raceway segments;
   a single inner bearing ring having a channel-shaped raceway on an outer side thereof, the raceway being divided by an axially centrally encircling annular groove into two raceway segments;
   a bearing cage formed by two structurally identical comb-shaped cages which act independently of each other and which are arranged and dimensioned so that the comb-shaped cages are insertable into the ball roller bearing through a radial spacing between the bearing rings; and
   a plurality of ball rollers, which roll between the bearing rings in the raceways, the plurality of ball rollers being held with uniform spacings to one another in a circumferential direction by the bearing cage, which each have two side surfaces that are flattened symmetrically from a spherical shape and are arranged parallel to one another, and which have a width between the two side surfaces that is dimensioned to be larger than the radial spacing between the bearing rings,
   the plurality of ball rollers include a row of ball roller alternating between a first orientation about a first contact angle axis and a second orientation about a second contact angle axis with the plurality of ball rollers orientated about the first contact angle axis having a first running surface and rolling about the first running surface on two diagonally opposite ones of the raceway segments of the bearing rings and the plurality of ball rollers orientated about the second contact angle axis having a second running surface and rolling about the second running surface on another two diagonally opposite ones of the raceway segments of the bearing rings, which are opposite the raceway segments on which the plurality of ball rollers orientated about the first contact angle axis roll,
   the comb-shaped cages have a plurality of lugs which are integrally formed on the comb-shaped cages and which project obliquely outward from the comb-shaped cages, the lugs axially fix the comb-shaped cages in the ball roller bearing by latching into the raceway of the outer bearing ring, and
   the ball roller bearing being filled with the plurality of ball rollers according to an axial-tilt eccentric assembly process through the radial spacing between the bearing rings.

2. The ball roller bearing as claimed in claim 1, wherein the plurality of ball rollers orientated about the first contact angle axis are guided in corresponding cage pockets of one of the comb-shaped cages, and the plurality of ball rollers orientated about the second contact angle axis are guided in corresponding cage pockets of another of the comb-shaped cages.

3. The ball roller bearing as claimed in claim 2, wherein the one of the comb-shaped cages and the another of the comb-shaped cages each have a rectangular cross-sectional profile with an outer profiled limb aligned radially toward the inner bearing ring and an inner profiled limb aligned axially into a bearing interior, forming the cage pockets, which are semi-circular recesses.

4. The ball roller bearing as claimed in claim 3, wherein the cage pockets have a base formed with a bevel matched to an inclination of the contact angle axes of the plurality of ball rollers held in the cage pockets.

5. The ball roller bearing as claimed in claim 1, wherein, the running surfaces of the plurality of ball rollers each have an edge region such that when the bearing is at a standstill, the plurality of ball rollers, which each bear with the edge region of the running surfaces against the pocket bases of the cage pockets of the one of the comb-shaped cages and with one of the side surfaces against undersides of the lugs of another of the comb-shaped cages, are fixed in a starting position corresponding to an inclination of the contact angle axes of the plurality of ball rollers.

6. The ball roller bearing as claimed in claim 1, wherein the raceway segments have radii and the running surfaces of the plurality of ball rollers have radii which are smaller than the radii of the raceway segments and the plurality of ball rollers each roll with only punctiform contact on the raceway segments of the bearing rings.

7. The ball roller bearing as claimed in claim 1, wherein the lugs are formed at every other one of the pockets in the circumferential direction.

* * * * *